UNITED STATES PATENT OFFICE 2,534,913

CYANINE DYESTUFFS AND INTERMEDIATES CONTAINING ALDEHYDE

John David Kendall and Frank Peter Doyle, Ilford, England, assignors to Ilford Limited, Ilford, England, a British Company No Drawing. Application June 3, 1948, Serial No. 30,976. In Great Britain June 4, 1947

5 Claims. (Cl. 260—240.6)

This invention relates to the production of compounds which serve as dyestuffs and dyestuff intermediates.

In our co-pending application Ser. No. 30,977, filed June 10, 1948, we have described processes for the production of dyestuff intermediates which comprise reacting a carbocyanine dye of the general Formula I:

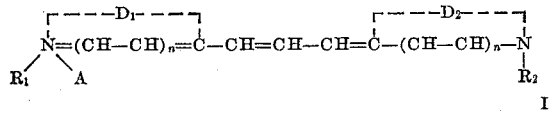

I (this being one of the resonance extremes) wherein $R_1$ and $R_2$ are the same or different and are alkyl, hydroxyalkyl, aralkyl or hydroxyaralkyl groups, $D_1$ and $D_2$ are the same or different and are residues of five-membered or six-membered heterocyclic nitrogen rings, $n$ is nought or one and A is an acid radicle, with an acid HX where X is the acid radicle and a trithio orthoformate of the formula $HC(SR_3)_3$ where $R_3$ is an alkyl or aralkyl group, the reaction being effected in the presence of a carboxylic acid or anhydride, which is a solvent for the reacting materials.

The products of that reaction are believed to be compounds of the general Formula II:

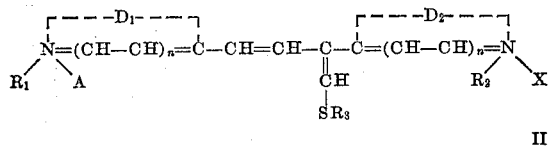

II or the isomers in which the =CH—SR$_3$ grouping is attached to the carbon atom of the chain which is adjacent the ring of which $D_1$ is a residue. Normally only one isomer appears to be formed. Where $D_1$ and $D_2$ are the same, the isomers will be identical. The precise location of the quaternising groups in the final products is indeterminate; they may be $R_1A$ and $R_2X$ as shown or they may be $R_2A$ and $R_1X$. Moreover, the anion X may replace A if the RX salts are much less soluble. Where $R_1$ or $R_2$ contains an hydroxy group this may be acylated under the conditions of the reaction and to that extent the character of $R_1$ and $R_2$ may differ in the products from their character in the original compounds.

It is stated in the said application Ser. No. 30,977 that the groups $R_1$ and $R_2$ are preferably lower alkyl or hydroxy-alkyl groups, e. g. methyl, ethyl or propyl groups or the corresponding hydroxyalkyl groups, e. g. β-hydroxyethyl.

It is further stated that since in most cases the products are used for further condensations and such condensations frequently result in the removal of the $SR_3$ group, the nature of the group $R_3$ is not of special importance. It may be ethyl, in which case the reagent employed is triethyl trithio-orthoformate which is the most readily obtainable compound of the series. However, it may be any other alkyl group or aralkyl group, e. g. tribenzyl trithio-orthoformate.

The acid HX may be of any strong acid, but the hydrohalic acids, e. g. HCl and HBr, and p-toluene sulphonic acid are preferred. The solvent acid or anhydride is preferably a weak acid, e. g. acetic acid or acetic anhydride.

The reaction should be effected under substantially anhydrous conditions, i. e. in the absence of any hydrolytic substance, and is best effected by heating the reagents together.

According to the present invention dyestuff intermediates of the foregoing general Formula II but in which $n$ is nought and $D_1$ and $D_2$ are the same or different and represent the residues of five-membered heterocyclic nitrogen rings, are treated with a hydrolytic agent, e. g. water, or an alcohol (for instance ethyl alcohol or ethylene glycol).

The course of the resulting reaction is believed to be as follows:

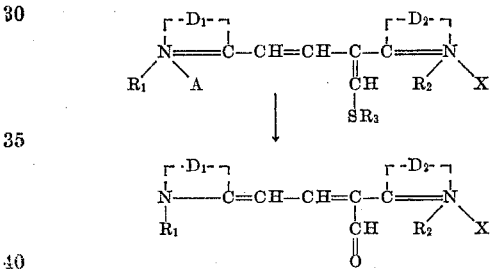

(This latter formula represents one of the resonance extremes.)

Actually the question of whether the group X or the group A is split off in the reaction depends on the particular materials used, i. e. on the nature of those groups.

The isomeric forms of the initial materials referred to above react similarly and it is to be understood that the products may be of the alternative type in which the aldehyde group is attached to the carbon atom nearer to the $D_1$ ring.

The residues $D_1$ and $D_2$ may be selected from the residues of thiazoles, oxazoles, selenazoles and their polycyclic homologues, such as those of the benzene, naphthalene, acenaphthene and anthracene series, indolenines, oxazolines, thiazolines and selenazolines. The polycyclic compounds of this series may also be substituted in the carbocyclic rings with one or more groups such as alkyl, aryl, amino, hydroxy, alkoxy and methylene-dioxy groups, or by halogen atoms.

It is not necessary to isolate the intermediate of general Formula II. Instead, the reaction mixture from the process of co-pending application No. 30,977, filed June 3, 1948, which contains the required intermediate, may be treated with the hydrolytic agent. The reaction sometimes takes place merely by allowing the reagents to stand together but in other cases it is desirable to warm the reagents to accelerate the reaction.

The compounds obtained are photographic sensitising dyes, i. e. when incorporated in gelatin silver halide emulsions they impart to such emulsions sensitivity to a range of wavelengths additional to the range to which the emulsion is naturally sensitive.

The following examples, in which the parts are by weight, illustrate the invention.

EXAMPLE 1

*Preparation of 3.3'-diethyl-8-formyl thiacarbocyanine iodide*

METHOD A 3.3' - diethyl - thiacarbocyanine iodide (4.9 parts), toluene-p-sulphonic acid (2.5 parts), triethyl trithio-ortho-formate (2.5 parts) and acetic anhydride (25 parts) were refluxed until a bright yellow-orange colour was present (5 minutes). The solvent was then distilled in vacuo and the residue after washing with ether dissolved in ethyl alcohol and poured into aqueous potassium iodide solution. The red solid which precipitated slowly from this solution was filtered, washed with water and ethyl alcohol and crystallised from methyl alcohol to give orange crystals with a green reflex. M. pt. 253° (decomp.).

METHOD B

The triethyl trithio ortho formate in the above method was replaced by trimethylthio ortho formate (2.0 parts) to give an identical product.

METHOD C

The triethyl trithio ortho formate used in Method A was replaced by tribenzyl trithio ortho formate (4.0 parts) to give an identical product.

This product, incorporated in a gelatino silver iodobromide emulsion, imparts a band of sensitivity extending to 5800 Å. with a sharp maximum at about 5500 Å.

EXAMPLE 2

*Preparation of 3.3'-diethyl - 8 - formyl-4.5:4'.5'-benzbenzoxacarbocyanine*

3.3' - diethyl - 4.5:4'.5' - benzbenzoxacarbocyanine-p-toluene sulphonate (6.0 parts), toluene-p-sulphonic acid (2.5 parts), triethyl trithio-orthoformate (2.2 parts) and acetic anhydride (25 parts) were refluxed for one hour and the excess solvent then distilled in vacuo. The product was isolated as in Example 1, the crude dyestuff being boiled out twice with methyl alcohol to give red crystals. M. pt. 278° (decomp.).

EXAMPLE 3

*Preparation of 3.3'-diethyl-8-formyl selenocarbocyanine iodide*

3.3'-diethyl selenocarbocyanine toluene-p-sulphonic acid (6.25 parts) triethyl trithio ortho formate (2.5 parts) and toluene-p-sulphonic acid (2.5 parts) were reacted in acetic anhydride (25 parts) as in Example 1. The product was isolated as before and crystallised from methyl alcohol to give brown glistening crystals. M. pt. 256° with decomposition.

This product, incorporated in a gelatino silver iodobromide emulsion, imparts a band of sensitivity extending to 6000 Å. with a maximum at about 5400 Å.

EXAMPLE 4

*Preparation of 3.3'-diethyl - 5.5'-dimethyl-8-formyl thiacarbocyanine iodide*

METHOD A 3.3'-diethyl 5.5'-dimethyl-thiacarbocyanine iodide (5.2 parts), trimethyl trithio ortho formate (2.0 parts) and toluene-p- sulphonic acid (2.5 parts) were reacted in acetic anhydride (25 parts) exactly as in Example 1. The product isolated as before gave after recrystallisation from methyl alcohol a red brown solid. M. pt. 265° (with decomposition).

METHOD B

The trimethyl trithio ortho formate used in Method A was replaced by triethyl trithio ortho formate (2.5 parts) to give as a first product 1-ethylthio-2.4-di - (5'-methyl - 2'-benzthiazolyl) 1:3-butadiene diethiodide (see copending application Ser. No. 30,977, Example 7). This solid when heated with methyl alcohol for 30 minutes gave the hydrolysed product, ethyl mercaptan being evolved. The dyestuff was filtered and crystallised from methyl alcohol to give a product identical with that from Method A.

This product, incorporated in a gelatino silver iodobromide emulsion, imparts a band of sensitivity extending to 6000 Å. with a maximum at about 5500 Å.

EXAMPLE 5

*Preparation of 3.3'-diethyl - 5.5' - dichloro-8-formyl-thiacarbocyanine iodide*

3.3'-diethyl-5.5'-dichlorothiacarbocyanine toluene-p-sulphonate was reacted with triethyl trithio ortho formate and toluene-p-sulphonic acid to give 1-ethylthio-2.4-di-(5'-chloro-2'-benzthiazolyl)-1:3-butadiene diethiodide as russet brown needles, as in copending application Ser. No. 30,977, Example 9. This material when heated with methyl alcohol for thirty minutes gave the desired dyestuff as a brown powder. M. pt. 298° (with decomposition).

EXAMPLE 6

*Preparation of 3.3' - diethyl - 4.5:4'.5' - dibenz-8-formyl-thiacarbocyanine iodide*

3.3'-diethyl - 4.5:4'.5' - dibenzthiacarbocyanine toluene-p-sulphonate was reacted with triethyl trithio ortho formate and toluene-p-sulphonic acid to give 1-ethylthio-2.4-di-(4'.5'-benzbenzthiazolyl)-1:3-butadiene diethiodide (as in copending application Ser. No. 30,977, Example 11) which was then heated with methyl alcohol to give the desired product contaminated with a little of the original carbocyanine. These were separated by recrystallisation to give the desired dyestuff as brown needles. M. pt. 302° (with decomposition).

What we claim is:

1. Process for the production of dyestuffs which comprises reacting with a hydrolytic agent selected from the class consisting of water and alcohols a compound of the general formula:

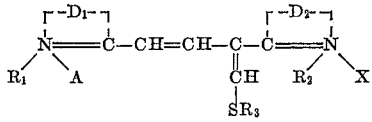

where $D_1$ and $D_2$ are each a residue selected from the class consisting of five-membered and six-membered heterocyclic nitrogen rings, $R_1$ and $R_2$ are each selected from the class consisting of alkyl, aralkyl, hydroxyalkyl, and hydroxyaralkyl groups, $R_3$ is selected from the class consisting of alkyl and aralkyl groups and A and X are acid radicles.

2. Process for the production of dyestuffs which comprises reacting with lower aliphatic alcohol a compound of the general formula:

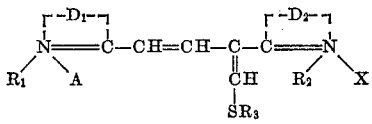

where $D_1$ and $D_2$ are each a residue selected from the class consisting of five-membered and six-membered heterocyclic nitrogen rings, $R_1$ and $R_2$ are each selected from the class consisting of alkyl, aralkyl, hydroxyalkyl, and hydroxyaralkyl groups, $R_3$ is selected from the class consisting of alkyl and aralkyl groups and A and X are acid radicles.

3. Process for the production of dyestuffs which comprises reacting with a hydrolytic agent selected from the class consisting of water and alcohols a compound of the general formula:

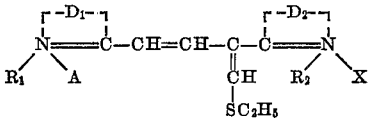

where $D_1$ and $D_2$ are each a residue selected from the class consisting of five-membered and six-membered heterocyclic nitrogen rings, $R_1$ and $R_2$ are each selected from the class consisting of alkyl, aralkyl, hydroxy-alkyl, and hydroxyaralkyl groups, and A and X are acid radicles.

4. Process for the production of dyestuffs which comprises reacting with a lower aliphatic alcohol a compound of the general formula:

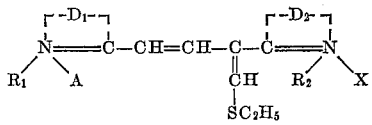

where $D_1$ and $D_2$ are each a residue selected from the class consisting of five-membered and six-membered heterocyclic nitrogen rings, $R_1$ and $R_2$ are each selected from the class consisting of alkyl, aralkyl, hydroxy-alkyl, and hydroxyaralkyl groups, and A and X are acid radicles.

5. Dyestuffs of the general formula:

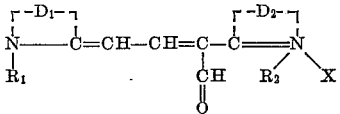

where $D_1$ and $D_2$ are each a residue selected from the class consisting of five-membered and six-membered heterocyclic nitrogen rings, $R_1$ and $R_2$ are each selected from the class consisting of alkyl, aralkyl, hydroxyalkyl, and hydroxyaralkyl groups and X is an acid radicle.

JOHN DAVID KENDALL.
FRANK PETER DOYLE.

REFERENCES CITED

The following references are of record in the file of this patent:

UNITED STATES PATENTS

| Number | Name | Date |
| --- | --- | --- |
| 2,166,736 | White et al. | July 18, 1939 |
| 2,226,158 | Davey | Dec. 24, 1940 |
| 2,263,749 | White et al. | Nov. 25, 1941 |
| 2,322,015 | Hamer et al. | June 15, 1943 |
| 2,340,882 | Kendall | Feb. 8, 1944 |
| 2,342,546 | Kendall | Feb. 22, 1944 |
| 2,353,164 | Kendall et al. | July 11, 1944 |
| 2,435,865 | Anish | Feb. 10, 1948 |

OTHER REFERENCES

Chemical Abstracts 16:3101 (abstract of Brit. Med. Journal, 1922, I, 514–515).

Chemical Abstracts 19:530 (abstract of Proc. Roy. Soc., London, 96B, 317–333, 1924).